United States Patent
Frankenberger et al.

(10) Patent No.: US 8,667,689 B2
(45) Date of Patent: Mar. 11, 2014

(54) METHOD AND ARRANGEMENT FOR SUPPLYING ESSENTIALLY HOLLOW BODIES WITH EQUIPMENT

(75) Inventors: Eckart Frankenberger, Hamburg (DE); Eike Klemkow, Hamburg (DE); Horst Zapp, Eversen (DE); Gerhard Muller, Buxtehude (DE); Holger Frauen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1299 days.

(21) Appl. No.: 11/786,927

(22) Filed: Apr. 13, 2007

(65) Prior Publication Data
US 2008/0250626 A1   Oct. 16, 2008

(51) Int. Cl.
*B21D 39/03* (2006.01)

(52) U.S. Cl.
USPC ............................... 29/897.2; 29/429; 29/430

(58) Field of Classification Search
USPC ............................... 29/429, 430, 897.2, 897.3
See application file for complete search history.

(56) References Cited

U.S. PATENT DOCUMENTS

| | | | | |
|---|---|---|---|---|
| 2,405,544 A | * | 8/1946 | Anjeskey | 29/430 |
| 2,757,447 A | * | 8/1956 | Barenyi | 29/430 |
| 5,267,385 A | * | 12/1993 | Ikeda et al. | 29/429 |
| 5,893,208 A | * | 4/1999 | Sasaki | 29/711 |
| 6,237,210 B1 | * | 5/2001 | Stoewer et al. | 29/430 |
| 2005/0150094 A1 | * | 7/2005 | Moore et al. | 29/407.04 |

* cited by examiner

*Primary Examiner* — David Bryant
*Assistant Examiner* — Christopher Besler
(74) *Attorney, Agent, or Firm* — Jenkins, Wilson, Taylor & Hunt, P.A.

(57) ABSTRACT

Method and arrangement for supplying essentially hollow bodies with equipment wherein the hollow bodies each have a transverse dimension and a longitudinal dimension being larger than the transverse dimension. The bodies have at least one opening for accessing their interior from outside along their longitudinal dimension. The hollow bodies are arranged essentially side-by-side along the longitudinal dimension and they are moved along their transverse dimension in a clocked fashion. An arrangement comprises a plurality of conveyor means for moving hollow bodies, wherein the conveyor means are arranged such that the hollow bodies are arranged side-by-side along their longitudinal dimension and moved along their transverse dimension in a clocked fashion.

7 Claims, 8 Drawing Sheets

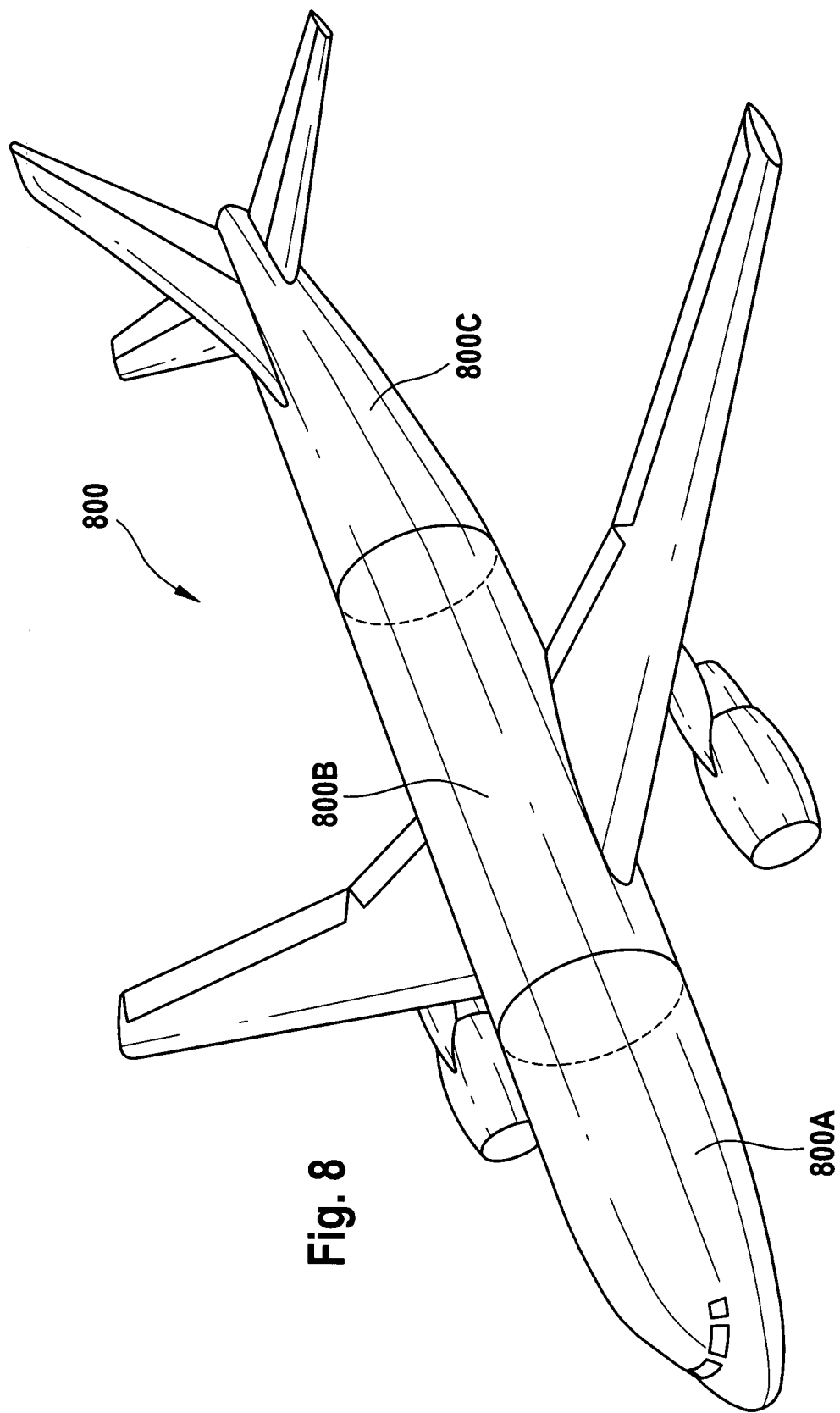

METHOD AND ARRANGEMENT FOR SUPPLYING ESSENTIALLY HOLLOW BODIES WITH EQUIPMENT

BACKGROUND OF THE INVENTION

The invention relates to a method and an arrangement for supplying essentially hollow bodies with equipment. The invention further relates to a method for fabricating aircraft fuselages, an aircraft fuselage, and an aircraft. The invention also relates to an arrangement for supplying essentially hollow bodies with equipment and an assembly hall for assembling aircraft parts.

Manufacturing today often means assembling or handling large and bulky devices, for example parts of airplanes and the like. Further such parts or bodies sometimes need to be supplied with particular equipment during manufacture.

PRIOR ART

In some conventional manufacturing processes assembly lines are employed in which interchangeable parts are added to a product in a sequential manner to create a finished product. The assembly line concept is prominent in car manufacturing where auto parts are continuously added to the vehicle, which is continuously moving along the assembly line. In car manufacturing the actual body to be supplied with parts is usually accessible and open from all its sides. Difficulties may arise when bodies to be supplied with equipment have a peculiar geometry and comprise only few openings therein to access the interior for installing additional parts.

Conventional objects to be supplied with equipment have a symmetry axis, for example a longitudinal axis, along which they usually are conveyed in order occupy only narrow amounts of space of the actual assembly line in a corresponding factory work floor. Then, working stations are situated around the part or device on the assembly line.

SUMMARY OF THE INVENTION

Embodiments of the invention comprise a method for supplying the interiors of a plurality of essentially hollow bodies with equipment. Each of said hollow bodies has a transverse dimension, a longitudinal dimension, which is larger than said transverse dimension, and at least one opening for accessing the interior from the outside along said longitudinal dimension. The hollow bodies are arranged essentially side-by-side along the longitudinal dimension, and they are moved along their transverse dimension in a clocked fashion.

Another embodiment of the invention may provide an arrangement for supplying essentially hollow bodies with equipment wherein such an arrangement comprises a plurality of conveyor means for moving said hollow bodies. The conveyor means are arranged such that said hollow bodies are arranged essentially side-by-side along their longitudinal dimension and moved along their transverse dimension in a clocked fashion.

BRIEF DESCRIPTION OF THE DRAWINGS

In the accompanying drawings:

FIG. 8 shows an embodiment of an airplane having a fuselage being supplied with equipment in its interior.

DETAILED DESCRIPTION OF EMBODIMENTS

In the following aspects and embodiments of the invention are illustrated and described with reference to the drawings.

Figure 1:
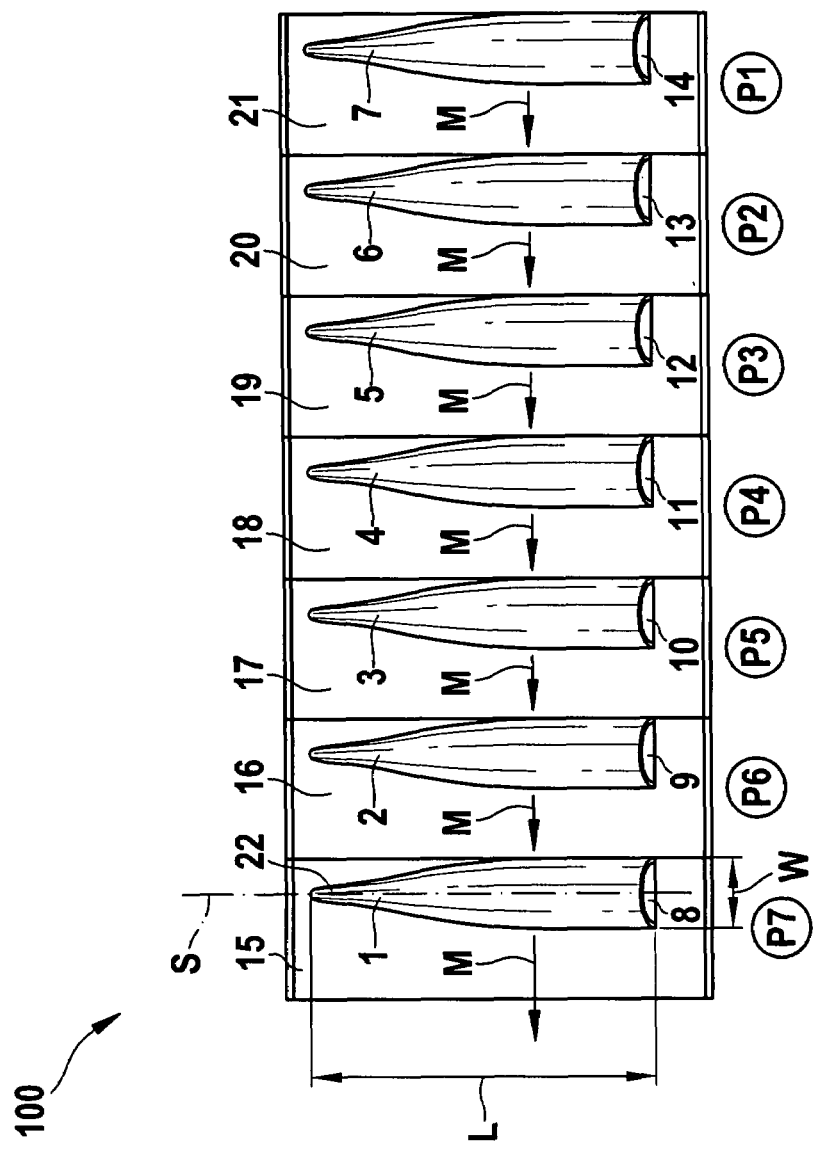
FIG. 1 illustrates an embodiment of a method and an arrangement for supplying interiors of hollow bodies with equipment.

Referring to FIG. 1 a first embodiment of a method and an arrangement for supplying the interiors of a plurality of essentially hollow bodies with equipment is illustrated. FIG. 1 shows exemplary hollow bodies 1-7 each having a longitudinal dimension L and a transverse dimension W. For better intelligibility only hollow body 1 has assigned a symmetry axis S along its longitudinal dimension.

The bodies 1-7 can be comparatively large or bulky devices, such as devices used to manufacture aircraft and the like. The bodies can have a tubelike structure wherein a first end 22 of the tube is closed and a second end 8 of the tubelike structure is open. This is as an example shown for the hollow body 1. However, other geometries of the hollow bodies are feasible.

The hollow bodies 1-7 shall be equipped with equipment to be placed in the interior of the hollow bodies 1-7. This can be done by accessing the interior of the hollow bodies 1-7 through the openings 8-14. Then access is essentially granted along the longitudinal dimension or along the longitudinal axis S through the opening 8 into the interior of a respective body 1.

The bodies 1-7 are essentially arranged side-by-side in parallel with their corresponding symmetry axis S. The bodies 1-7 are moved perpendicular to their longitudinal axis S in a clocked fashion, and the opening 8-14 of each hollow body 1-7 points in the same direction with respect to the clocked movement M of the bodies 1-7. The moving direction is indicated in FIG. 1 by arrows M.

The movement may be realized by movable jigs or movable platforms on which the bodies 1-7 to be supplied with interior equipment can be placed and supported. In FIG. 1 respective conveyor means 15-21 are illustrated by reference symbols 15-22. The respective conveyor means 15-21 can be guided by a railway or may comprise automatically controlled wheels or undercarriages for providing a stable-movement along the direction M which is essentially parallel to the transverse dimension of the bodies 1-7. It can be contemplated of other means for conveying the bodies 1-7, such as a monorail system, carts, movable carriers or the like.

In FIG. 1, seven positions P1-P7 of the bodies 1-7 are shown. At each position P1-P7, wherein other numbers of positions can be contemplated, the bodies 1-7 on the conveyor means 15-21, for example movable carts or trolleys, halt for the predetermined clock period until they are moved forward to the next position. For example first body 7 is halted or stopped at position P1 for a certain clock period. During this clock period equipment is installed in the interior of body 7 by accessing the interior through the opening 14 and distributing and installing the equipment inside the hollow body 7. The same is done during the same clock period installing different types of equipment at each of the positions P2-P7 into the interiors of the other hollow bodies 6, 5, 4, 3, 2, 1, respectively.

For example hollow body 1 has been fed through positions P1-P6 and is already supplied with respective apparel or equipment over a time period of six times the predetermined clock period. The clock period can be adjusted according to the time needs of staff performing the actual supply of the equipment at the positions P1-P7. Hence, the corresponding equipment needed to supply the interiors of the hollow bodies 1-7 is installed in a sequential manner and in a clocked fashion at the positions P1-P7.

Because the openings 8-14 point to the same side of the movement direction M, for example a specialized team of technicians or assembly men may enter the interior of the hollow bodies 1-7 without the need of covering longer distances. In employing the embodiment shown in FIG. 1 for aircraft manufacturing the hollow bodies 1-17 for example can be regarded as fuselage sections or fuselages. Depending on the type of aircraft to be manufactured the openings 8-14 of the fuselage parts or sections can have varying diameters. While short range single aisle cabins may have a fuselage diameter of 4 meters a long range aircraft like an Airbus A380 have a fuselage diameter of 7.14 meters. Also the length L of for example prefabricated fuselage sections may vary and add up to a cabin length of 24 meters for a Airbus A319 up to a cabin length of roughly 50 meters of an Airbus A380.

Figure 2:
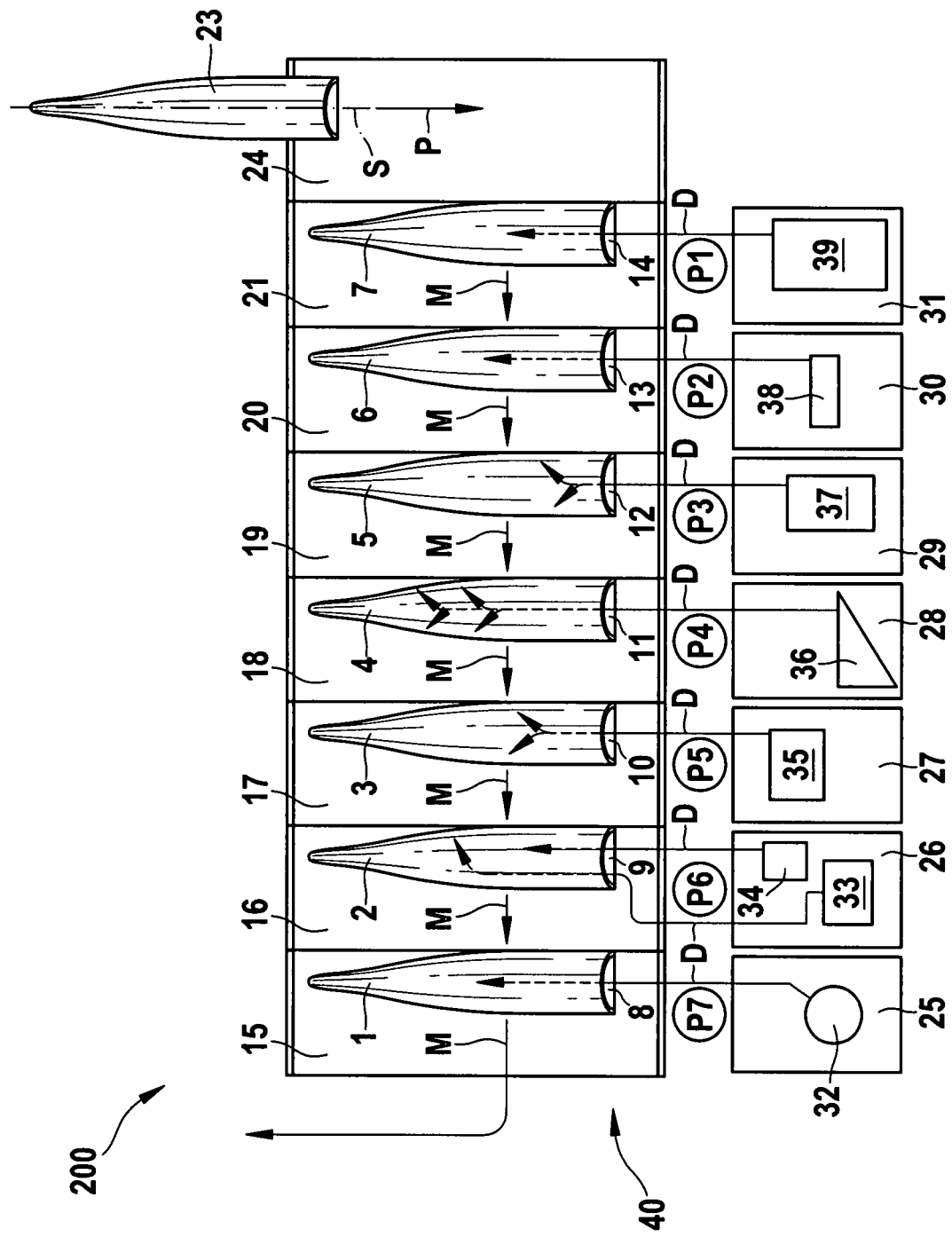
FIG. 2 illustrates a second embodiment of a method and an arrangement for supplying interiors of hollow bodies with equipment.

FIG. 2 illustrates a second embodiment of a method for supplying the interiors of essentially hollow bodies with equipment. Like or essentially like elements with respect to the embodiment of FIG. 1 are assigned the same reference symbols.

FIG. 2 shows hollow bodies, for example parts or sections of aircraft fuselages 1-7, 23 placed on movable jigs 15-21, 24. The sequence of movable jigs 15-21, 24 thereby forms a moving line 40, for example similar to an assembly line, on which the parts of aircraft fuselages 1-7 are conveyed in a clocked fashion and transverse to the longitudinal axis S.

The movable jigs 15-21 are halted or stopped in each case at positions P1-P7 where supply stations 25-31 are situated. The supply stations 25-31 can be regarded as working stations from which assembly staff enters the fuselages 1-7 through the respective opening 8-14 in order to install equipment 32-39 provided at the corresponding working station or supply station 25-31. The supply stations 25-31 can be platforms on which the relevant technical equipment can be stored and brought to be assembled inside the hollow body or fuselage part 1-7.

The respective workmen climb and walk into the tubelike fuselage structure 1-7 through the opening 8-14 and have the predetermined clocking period at their disposal for installing predetermined equipment corresponding to the platform or working station or supply station 25-31. The transport and distribution of the relevant equipment 32-39 is indicated by arrows D in FIG. 2. The sequence of movable jigs 15-21, 24 providing a basis of the sequence of aircraft fuselages 1-7, 23 and forming the moving line 40 have the openings 8-14 of the fuselages 1-7 oriented towards the sequence of supply stations 25-31. Each supply station 25-31 is provided with a dedicated set of equipment 32-39. For the supply of an aircraft fuselage part with interior equipment.

For example, a prefabricated fuselage section 32 is first deposited on a jig 24, for example by a movement along its longitudinal axis S. Such movement is indicated by an arrow P in FIG. 2. Then, said prefabricated fuselage section 23 is conveyed on the jig to the first supply station 31 and the start of a clocking period is triggered. Hence, the fuselage 23 (or 7, respectively) at a position P1 is now equipped with a set of equipment 39 provided at the supply station 31. For example, prefabricated complex parts can be assembled and installed inside the prefabricated fuselage section 23, 7, respectively.

To each supply station 25-31 dedicated work contents are assigned, such that the resulting sequence of assembling or work contents along the moving line 40 can be optimized. For example, the dedicated sets of equipment 32-39 or work contents to be performed at the supply stations 25-31 may be adapted as a function of the needs and request of the orderer of an aircraft. The working contents or installation routines at the positions P1-P7, or supply stations 25-31, respectively, do require the same amount of time. Hence, the transport of the fuselage sections 1-7, 23 along the moving line 40 is clocked with a clocking period.

The supplying of the sets of equipment 32-39 may comprise installing isolation material, inserting window frames or windows, assembling electric or hydraulic facilities, lines, wiring, placing water-, fuel-, or oxygen-conducts, preparing and installing air condition devices, control circuits, cables, tubes or, for example at one of the last supply stations, carpeting or installing other interior decoration, for realizing an actual aircraft cabin. Other commonly known equipment or operations can be assigned to the supply stations 25-31.

Because the work content at the different supply stations 25-31 is done in parallel at the same time for all prefabricated fuselage sections 1-7 on the jigs 15-21, 24 the lead time for manufacturing the aircraft fuselage can be reduced with respect to conventional concepts. The clocked fashion of the transport on the moving line 40 may cause the assembly men teams assigned to the supply stations 25-31 to work more efficient due to the limited clock period for supplying and installing the sets of equipment 32-39. For example, a total of nine supply stations and a clocking period of 9.3 hours can result in a lead time for manufacturing a complete aircraft fuselage of five days. For example, the workmen may work in shifts from 6.00 a.m. to 10.00 p.m.

Figure 3:
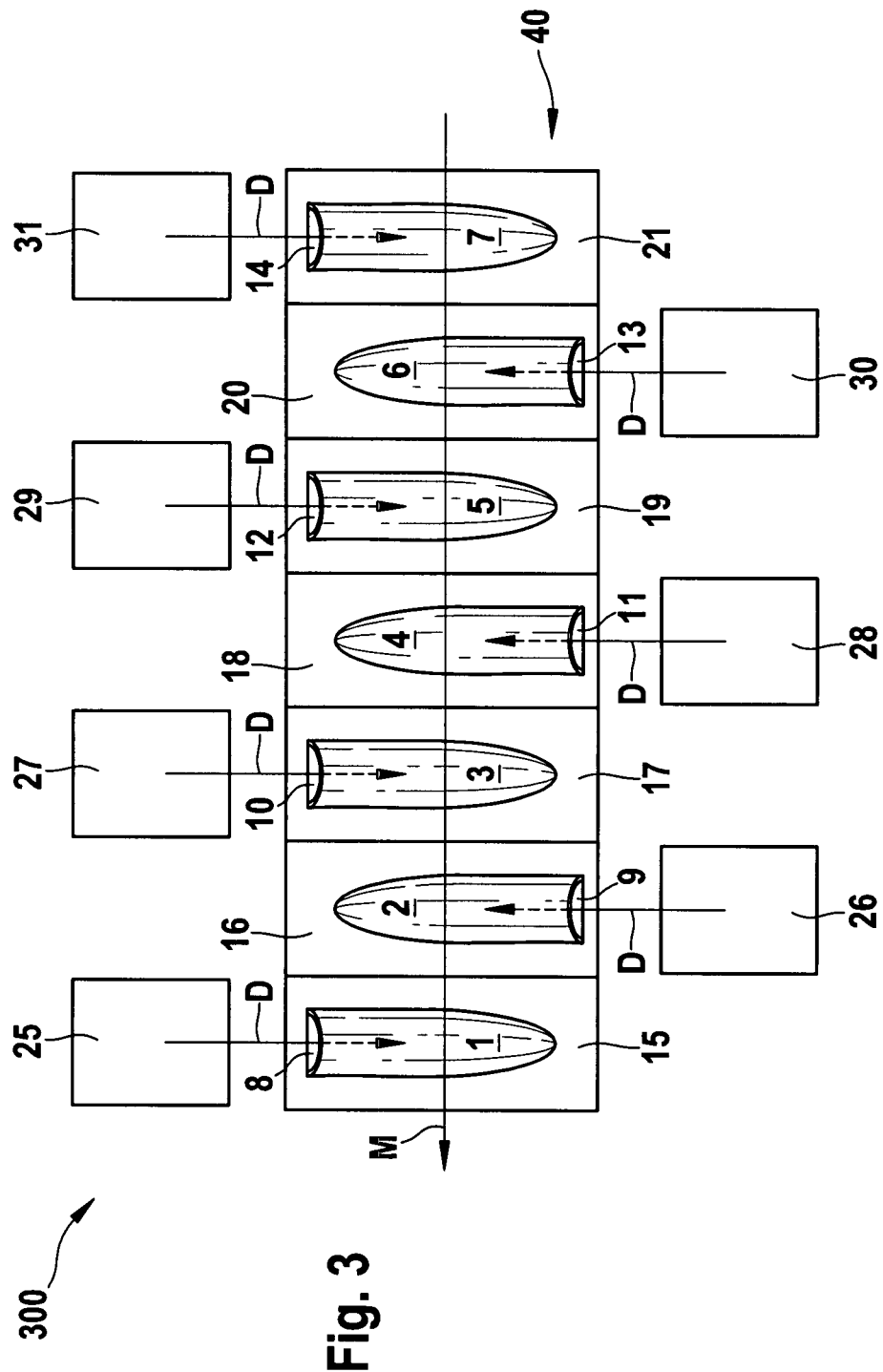
FIG. 3 illustrates a third embodiment of a method and an arrangement for supplying the interiors of hollow bodies with equipment.

FIG. 3 shows a third embodiment for a method and an arrangement 300 for supplying hollow bodies with equipment. Like functions and like elements, as already shown and described with respect to FIGS. 1 and 2, are assigned the same reference symbols.

According to the third embodiment 300 prefabricated aircraft parts, for example front sections of aircraft fuselages 1, 3, 5, 6 and rear sections of aircraft fuselages 2, 4, 6 are placed in an alternating manner on movable jigs 15-21 and fed into a moving line 40 along supply stations 25-31. For example, a front section 1 and a rear section 2 of an aircraft fuselage can be merged at their openings 8, 9 for forming an entire or complete aircraft fuselages.

The openings 8, 10, 12, 14 of the front sections 1, 3, 5, 7 point to the right-hand-side with respect to the moving direction M of the moving line 40, and the openings 9, 11, 13 of the rear sections 2, 4, 6 point to the left-hand-side with respect to the moving direction M of the moving line 40 formed by the movable jigs 15-21. Hence, the openings 8-14 of subsequent fuselage sections 1-7 or hollow bodies, respectively, point to opposite directions.

Consequently, first supply stations 25, 27, 29, 31 are situated opposite to the openings of the openings 8, 10, 12, 14 of the front parts 1, 3, 5, 7, and second supply stations 26, 28, 30 are situated opposite to the openings 9, 11, 13 of the rear parts 2, 4, 6.

In an alternative mode of use, the embodiment according to FIG. 3 would also allow to supply the interiors of aircraft fuselages corresponding to two different types of airplanes using the same moving line 40. In such a configuration for example, fuselages of a first type 1, 3, 5, 7 require more sets of equipment or working contents at the supply stations 25, 27, 29, 31 than, for instance, smaller aircraft fuselages 2, 4, 6, wherein the latter can be supplied with the relevant equipment by use of only three supply stations 26, 28, 30. The shown number of supply stations 25-31 is chosen arbitrarily and can be adapted according to the need for supplying fuselages with equipment.

Figure 4:
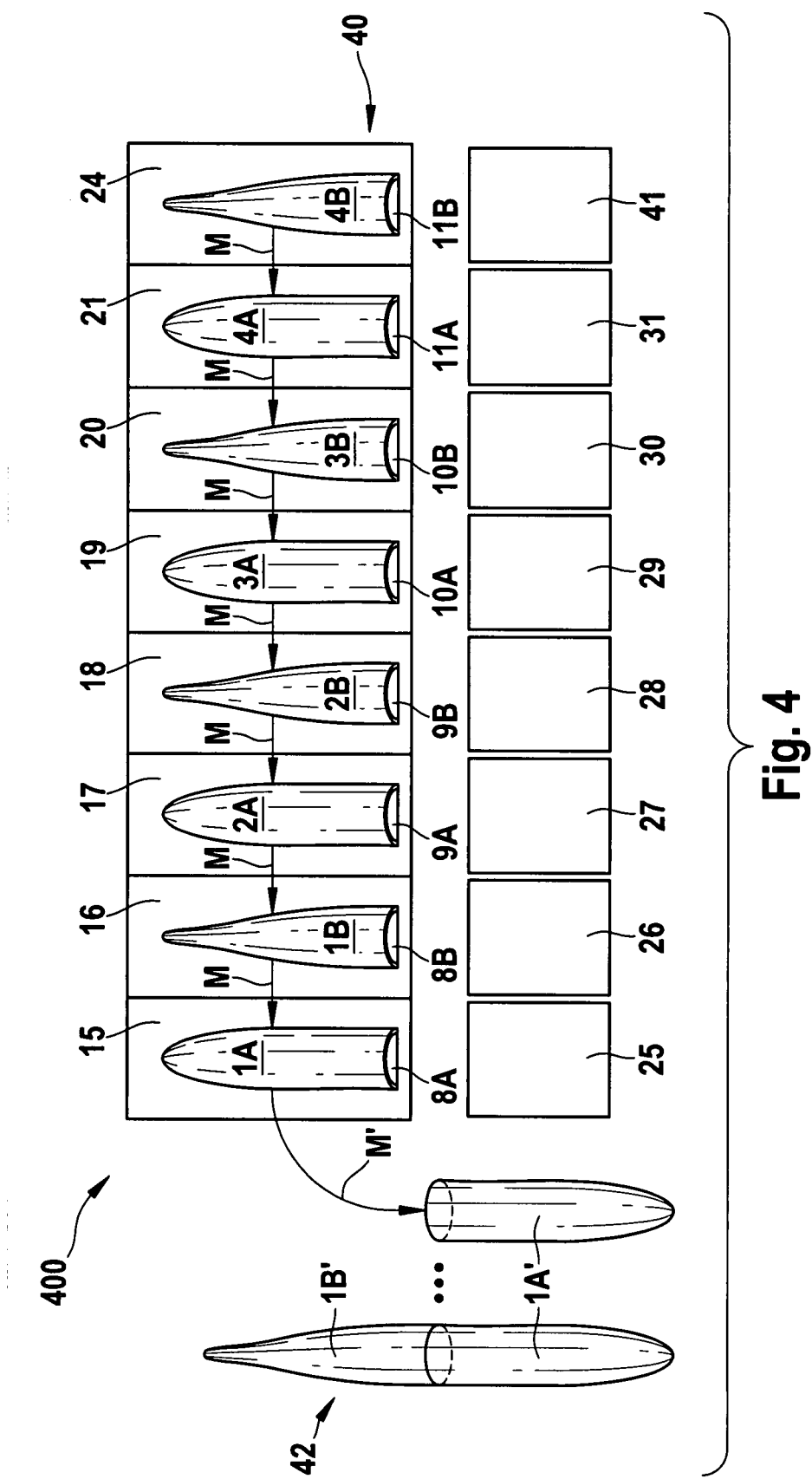
FIG. 4 illustrates an embodiment of a method and an arrangement for supplying pre-fabricated aircraft fuselages with equipment.

Another, embodiment of a method and an arrangement for supplying, for example parts of aircraft fuselages with equipment is shown in FIG. 4. Two types of prefabricated fuselage sections are sequentially placed on movable jigs 15-21, 24, wherein each fuselage section 1A-4A, 1B-4B, has a tubelike structure and an opening 8A-11A, 8B-11B. The fuselage sections 1A-4A, 1B-4B are arranged on the jigs 15-21, 24 such that their openings 8A-11A, 8B-11B point towards essentially the same direction. This direction is essentially perpendicular to the movement direction of the clocked or pulsed movement M.

Opposite to the sequence of openings 8A-11A, 8B-11B supply stations 25-31, 41 are arranged. For example, the first type of prefabricated fuselage sections 1A-4A may correspond to a front part of a complete aircraft fuselage, and the second type of prefabricated fuselage sections 1B-4B may correspond to a rear part of a corresponding complete aircraft fuselage. According to the embodiment as shown in FIG. 4 a front part 1A-4A is in each case followed by a rear part 1B-4B. And a sequence of prefabricated fuselage sections on the movable jigs 15-21, 24 is formed.

After being more or less completely equipped with dedicated equipment assigned to the supply stations 25-31, 41, for example, the front section 1A can be turned around as indicated by an arrow M' and is brought into a position indicated by reference character 1A' in FIG. 4. In a following step, a completely equipped rear part 1B is provided by the moving line 40 after the corresponding clocking period. Then, the front part 1A' and rear part 1B' of the aircraft fuselage can be fitted together at their openings 8A, 8B to form the actual complete aircraft fuselage. This is shown as the fuselage 41 having sections 1A' and 1B'.

Figure 5:
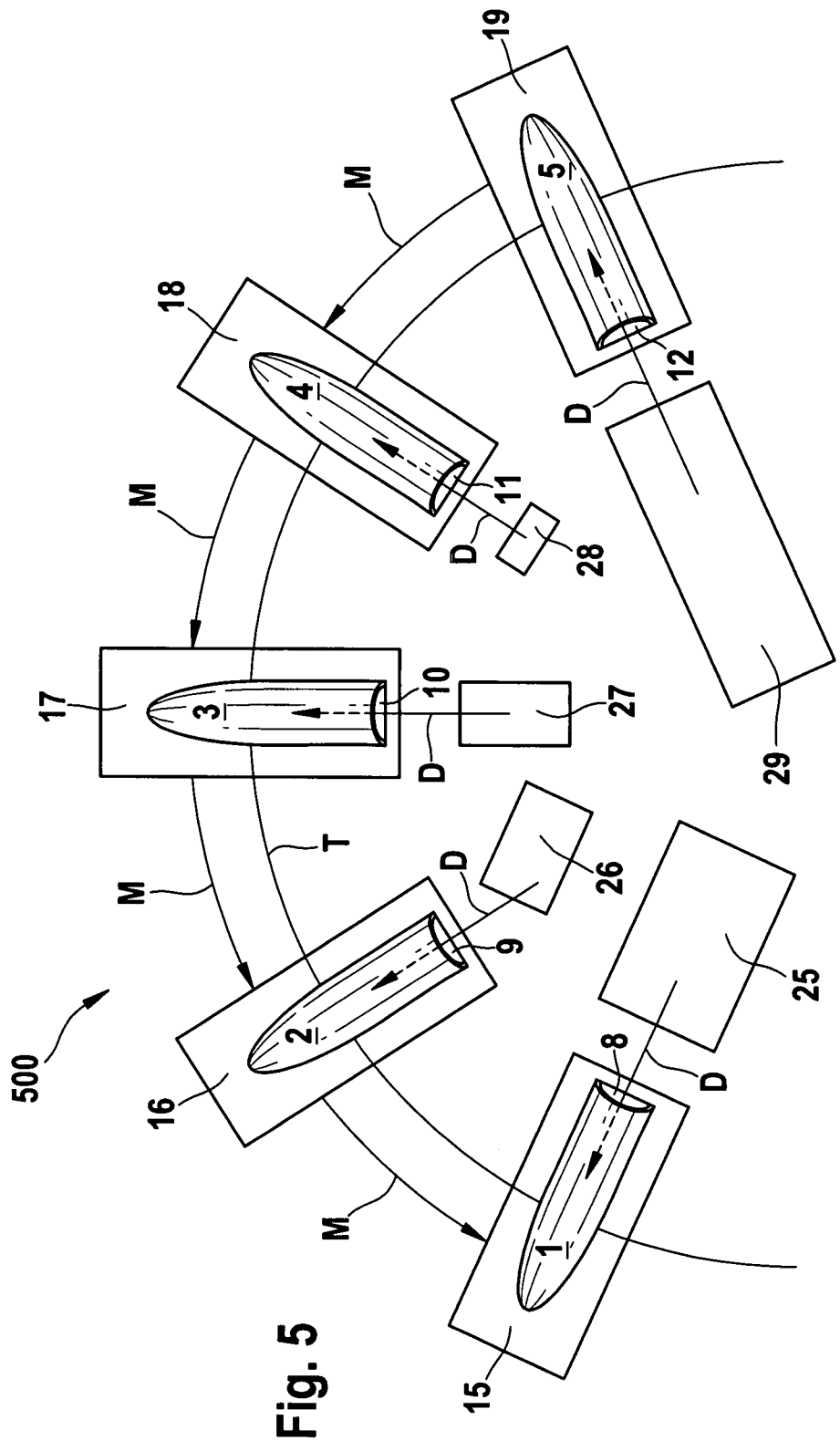
FIG. 5 illustrates a fourth embodiment of a method and an arrangement for supplying the interiors of hollow bodies with equipment wherein a curved moving line is used.

Yet another arrangement of movable jigs being moved in a clocked manner is shown in FIG. 5. The embodiment 500 in FIG. 5 shows movable jigs 15-19 that can be positioned along a curved trajectory T which, for example, can be the circumference of a circle. However, the trajectory may also have other more or less regular or irregular curved forms.

Fuselage sections or parts 1-5 are placed on the jigs 15-19, wherein the openings 8-12 point towards the same direction with respect to the trajectory T. However, the orientation of said parts 1-5 is only illustrative. The openings 8-12 may also point to the outside of the imaginary circle formed by the trajectory T, i.e. to the right-hand-side with respect to the moving direction. The moving direction of the jigs 15-19 is indicated by an arrow M. Opposite to the openings 8-12 supply stations. 25-29 are arranged. As can be seen from FIG. 5, the moving direction M of the jigs 15-19 and the fuselage parts 1-5, respectively, is transverse and perpendicular to the longitudinal axis of each fuselage part 1-5.

Technicians or assembly men enter the fuselage parts 1-5 through their respective opening 8-12 along its longitudinal direction from the corresponding supply station 25-29.

Alternatively, the parts 1-5 can be arranged to have their openings 9-12 pointing to different directions with respect to the movement direction M, for example similar to what is illustrated in FIG. 3. However, a corresponding supply station in each case can be provided opposite to the openings 9-12. The actual trajectory T can be adopted to the architecture and form of an available hangar, work floor, assembly hall etc.

Figure 6:
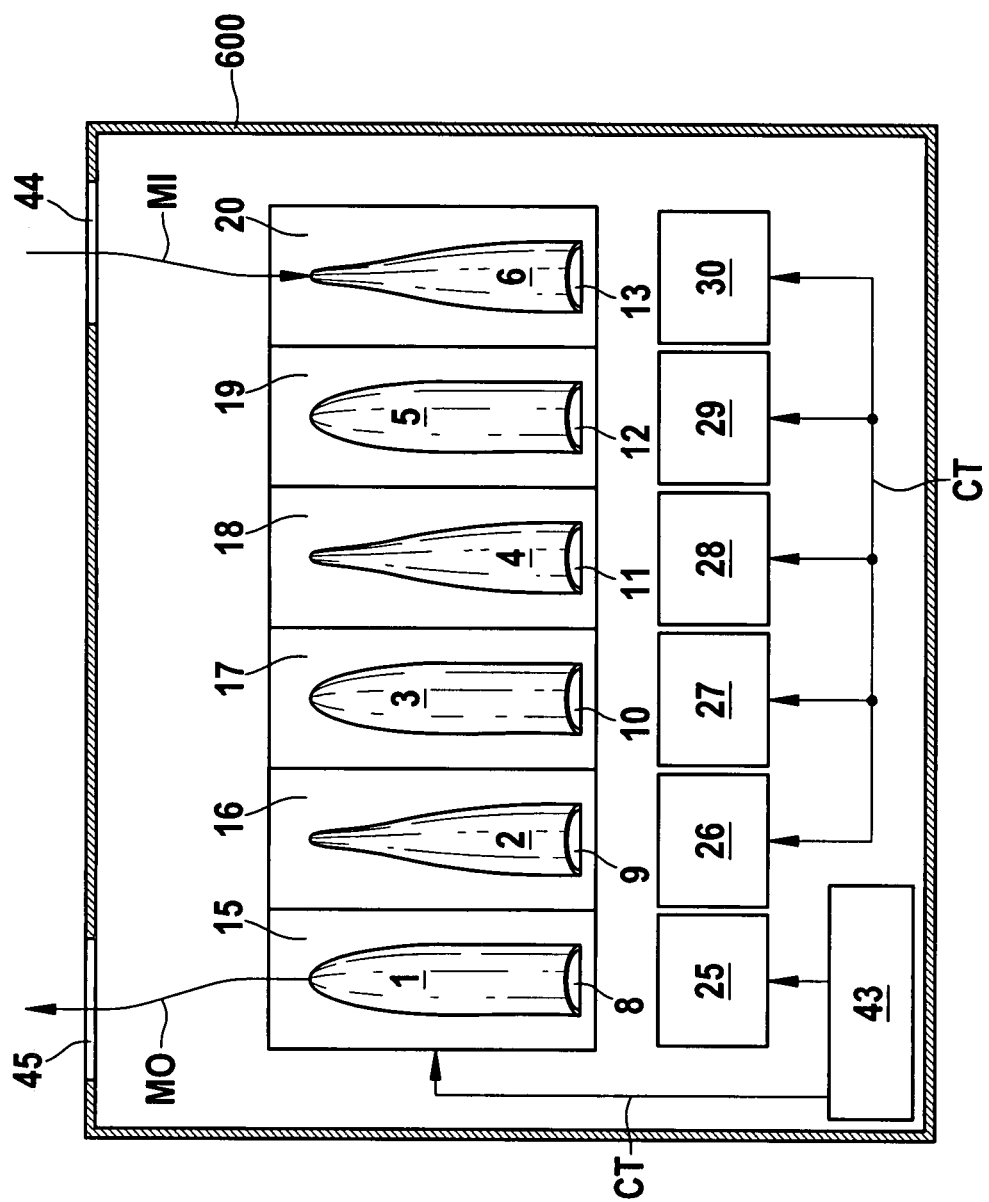
FIG. 6 illustrates an embodiment of an assembly hall.

Referring now to FIG. 6 an embodiment of an assembly hall 600 is shown schematically. The assembly hall 600 comprises an arrangement for supplying essentially hollow bodies with equipment, for example according to one of the foregoing embodiments.

The assembly hall 600 has an entrance 44 and an exit 45. The arrangement inside the assembly hall 600 comprises movable jigs 15-20 on which aircraft parts 1-6 can be placed and moved in a clocked fashion. The aircraft parts 1-6 have a tubelike hollow structure and comprise only one large opening 8-13 through which, for example, technicians can enter and install prefabricated equipment. Such equipment may be provided at supply stations 25-30.

The movement of the jigs 15-20 which function as conveyor means and the provision of dedicated sets of equipment to the supply stations 25-30 is controlled by a controller 43. The controller sends and receives control signals CT, for example in a wireless mode or in terms of a computer network. Such a network can comprise, for example, a databus or other means for communicating and sending signals to and from the controller 43 from and to the elements of the arrangement, such as the jigs 15-20 and supply stations 25-30.

The aircraft parts 1-6 can enter the assembly hall 600 through the entrance 44 in a movement indicated by arrow Ml. The aircraft parts 1-6 are processed or equipped with equipment in a sequential clocked manner, for example as illustrated with respect to the foregoing embodiments referring to FIGS. 1-5. After being equipped the aircraft parts may exit the assembly hall 600 through the exit 45 in a moving direction indicated as MO. The controller can adjust the movement of the jigs 15-20 and the equipment provided at the supply stations 25-30, for example, as a function of the desired equipment to be supplied to a complete aircraft fuselage according to the orderer or purchaser of that aircraft.

Figure 7:
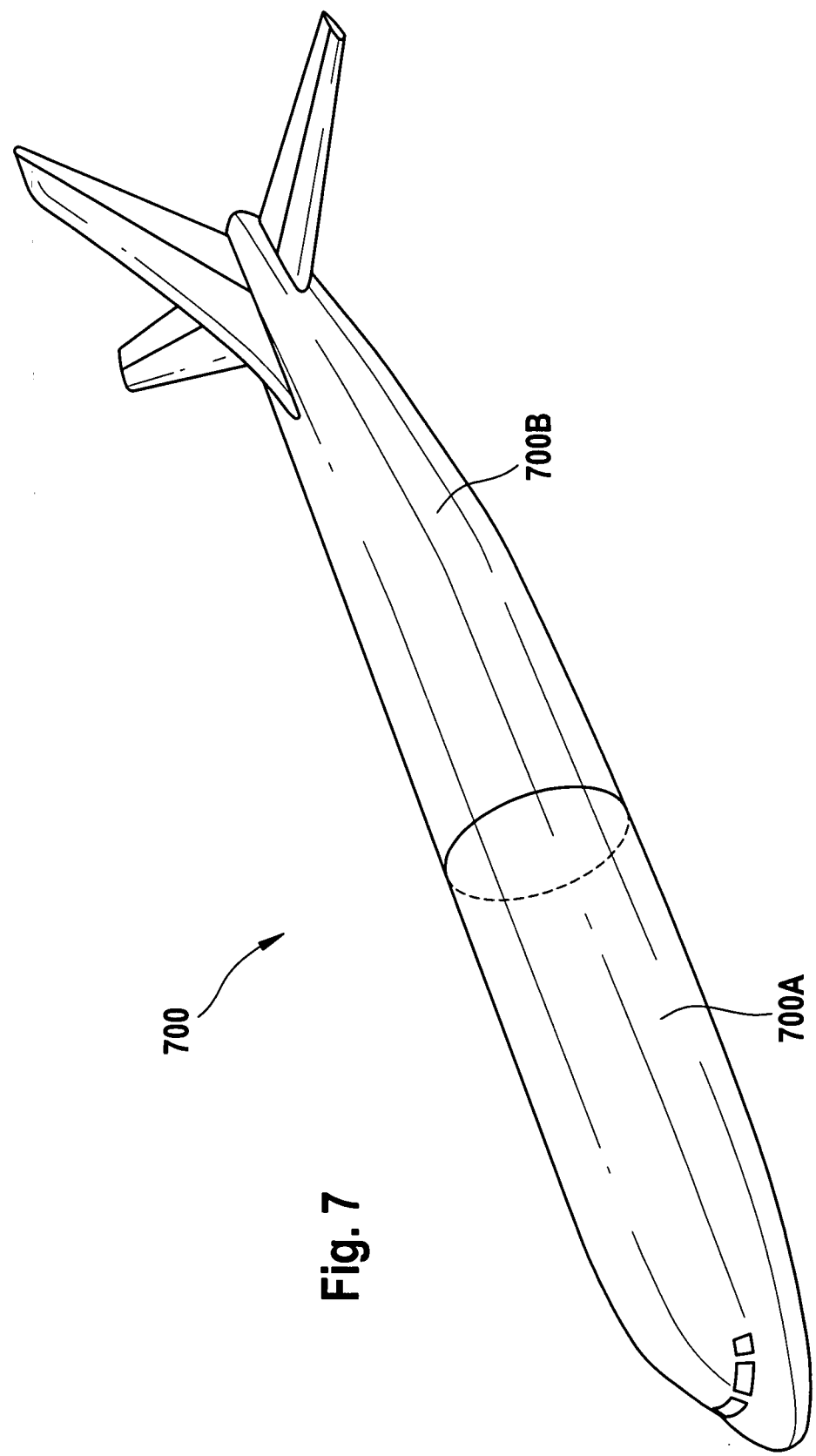
FIG. 7 shows an embodiment of an aircraft fuselage having an interior supplied with equipment.

Referring now to FIG. 7, a complete aircraft fuselage 700 is shown, wherein the interior of the fuselage 700 is supplied with equipment for example according to an embodiment of the method for supplying interiors of essentially hollow bodies. The aircraft fuselage 700 has a front part 700A and a rear part 700B that first can be separately supplied with its interior equipment, for example similar to what is shown in FIG. 4, and then merged to form the entire aircraft fuselage 700.

FIG. 8 illustrates an aircraft 800 having a fuselage that is equipped according to a method for fabricating aircraft fuselages, for example, as elaborated with respect to the foregoing embodiments. The embodiment of the aircraft 800 in FIG. 8 comprises three fuselage sections 800A, 800B and 800C. Each section essentially has a tubelike structure and the interior can be accessed by an opening at one of its ends during the fabrication.

It is to be noted that combinations of elements or aspects that are described with respect to the above embodiments of a method and an arrangement for supplying essentially hollow bodies with equipment may be combined and modified for providing alternative further embodiments according to the needs of a potential user. In principle any combination of features regarding said method an arrangement disclosed herein may present another embodiment of the invention.

For Example features of a first embodiment can be integrated in another embodiment although not explicitly shown in the drawings.

While various embodiments have been described in detail in the foregoing detailed description and illustrated in the accompanying drawings, those with ordinary skill in the art will appreciate various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A method for supplying interiors of a plurality of hollow bodies with equipment, wherein each hollow body of said plurality of hollow bodies comprises:
   a transverse dimension;
   a longitudinal dimension being larger than said transverse dimension, at least one opening for accessing an interior of the hollow body from outside along said longitudinal dimension; and
   at least a front section and a rear section, forming at least a section of an aircraft fuselage, the method comprising:
   arranging said plurality of hollow bodies side-by-side along their longitudinal dimension and moving said plurality of hollow bodies along their transverse dimension in a circular curved trajectory, and clocked fashion;
   halting at least one front section and at least one rear section at a plurality of supply stations for a plurality of predetermined clock periods;
   assigning and providing a predetermined set of equipment at each supply station of the plurality of supply stations;
   supplying the interior of the at least one front section and the interior of the at least one rear section during plurality of predetermined clock period with the predetermined set of equipment by entering the each interior through the at least one opening;
   adjusting said predetermined clock period or adjusting the predetermined set of equipment such that during the predetermined clock period the predetermined set of equipment is installed at the corresponding supply station;
   installing the predetermined set of equipment in the interior of the at least one front section and the at least one rear section; and
   forming said section of an aircraft fuselage by merging the at least one front section with the at least one rear section.

2. The method of claim 1, wherein the at least one opening of each hollow body of the plurality of hollow bodies point towards the same side with respect to a common moving direction of the hollow bodies.

3. The method of claim 1, wherein moving the plurality of hollow bodies comprises moving the plurality of hollow bodies providing at least one of: a movable carrier, a cart, a movable jig, a carrier rail or a trackway.

4. The method of claim 1, wherein the plurality of hollow bodies are moved by an assembly line along a pathway, and the plurality of the hollow bodies being halted at supply stations.

5. The method of claim 1, wherein each hollow body of said plurality of hollow bodies comprises a tube-like structure, their openings are formed by an open frontend of said tube-like structure, and a rear-end of said tube like structure is closed, wherein said tube like structures are aircraft parts, and the opening has a diameter of at least 2 meters.

6. The method of claim 1, wherein the-predetermined set of equipment comprises at least one of an isolation material, window frames, windows, electric or hydraulic facilities, lines, wiring, water-, fuel-, oxygen-conductors, air-condition devices, control circuitry, cables, tubes, or interior decoration.

7. the method of claim 1, wherein the curved trajectory is a circumference of a circle, and a curved form.

* * * * *